US011235992B2

(12) United States Patent
Lersch

(10) Patent No.: US 11,235,992 B2
(45) Date of Patent: *Feb. 1, 2022

(54) ELECTROMAGNETIC FLUID TREATMENT APPARATUS

(71) Applicant: Vodaa Technologies, LLC, Chandler, AZ (US)

(72) Inventor: John Lersch, Leon, WV (US)

(73) Assignee: VODAA TECHNOLOGIES, LLC, Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/592,659

(22) Filed: Oct. 3, 2019

(65) Prior Publication Data
US 2020/0062621 A1 Feb. 27, 2020

Related U.S. Application Data

(60) Provisional application No. 62/721,363, filed on Aug. 22, 2018.

(51) Int. Cl.
C02F 1/48 (2006.01)
(52) U.S. Cl.
CPC ........ *C02F 1/484* (2013.01); *C02F 2201/483* (2013.01); *C02F 2303/22* (2013.01)
(58) Field of Classification Search
CPC .................. C02F 1/484; C02F 1/485
See application file for complete search history.

(56) References Cited

U.S. PATENT DOCUMENTS

| 3,535,513 A | * | 10/1970 | Cirami | C02F 1/325 |
| | | | | 250/430 |
| 3,616,922 A | * | 11/1971 | Turnock | B03C 1/28 |
| | | | | 210/222 |
| 4,276,139 A | * | 6/1981 | Lawson | A61D 19/00 |
| | | | | 204/DIG. 5 |
| 4,304,667 A | * | 12/1981 | Dubourg | G21C 19/30 |
| | | | | 210/223 |
| 4,569,758 A | * | 2/1986 | Sandulyak | B03C 1/034 |
| | | | | 210/222 |

(Continued)

FOREIGN PATENT DOCUMENTS

GB 2160855 A * 1/1986 ............. C02F 1/484

*Primary Examiner* — David C Mellon
(74) *Attorney, Agent, or Firm* — Booth Udall Fuller, PLC

(57) ABSTRACT

Embodiments described herein relate to apparatus and methods for treating bodies of fluid. In an embodiment an apparatus includes a first rod spacer comprising a first rod aperture. Such an apparatus may also include a second rod spacer comprising a second rod aperture, the first rod aperture and the second rod aperture being circumferentially aligned about a centerline axis. Further, the apparatus may include a conductive rod extending between the first rod spacer and the second rod spacer, a first portion of the conductive rod being engaged with the first rod aperture and a second portion of the conductive rod being engaged with the second rod aperture, the conductive rod being configured to generate a magnetic field in response to an electrical current applied to the conductive rod, wherein the conductive rod is submersible in a body of chlorinated fluid for treatment of the body of fluid with the magnetic field.

20 Claims, 18 Drawing Sheets

(56) References Cited

U.S. PATENT DOCUMENTS

| | | | | |
|---|---|---|---|---|
| 5,622,622 A * | 4/1997 | Johnson | ................... | A61L 2/02 |
| | | | | 210/192 |
| 5,871,642 A * | 2/1999 | Meeks | ................... | C02F 1/481 |
| | | | | 210/222 |
| 6,325,942 B1 * | 12/2001 | Freije, III | .............. | B01J 19/087 |
| | | | | 210/222 |
| 9,850,148 B2 * | 12/2017 | Kolstad | ................... | C02F 1/481 |
| 2015/0239757 A1 * | 8/2015 | Hughes | ................... | G21F 9/10 |
| | | | | 204/557 |
| 2015/0344334 A1 * | 12/2015 | Lersch | ................... | C02F 1/485 |
| | | | | 210/222 |
| 2016/0016829 A1 * | 1/2016 | Hughes | ................... | C02F 1/487 |
| | | | | 204/661 |
| 2016/0207801 A1 * | 7/2016 | Stronczek | ............... | C02F 1/487 |
| 2016/0207812 A1 * | 7/2016 | Joo | ........................ | C02F 1/485 |

* cited by examiner

| Time (hr) | | Free Cl (mg/L) | | Total Cl (mg/L) | | Combined Cl (mg/L) | | Free NH3 (mg/L) | | Monochloramine (mg/L) | | pH | |
|---|---|---|---|---|---|---|---|---|---|---|---|---|---|
| | | Test | Ctrl | Test | Ctrl | Test | Ctrl | Test | Ctrl | Test | Ctrl | Test | Ctrl |
| Initial | 0 | 5.3 | 5.3 | 5.6 | 5.4 | 0.3 | 0.2 | 0.0 | 0.0 | 0.0 | 0.0 | 7.8 | 8.0 |
| Combined Chlorine | 24 | 0.0 | 0.0 | 3.9* | 4.4* | 3.9* | 4.4 | 0.8* | 0.7* | 3.6* | 4.2* | 7.7* | 7.9* |
| Breakpoint | 27 | 1.7* | 1.3* | 1.8* | 1.5* | 0.1 | 0.1 | 0.0 | 0.0 | 0.0 | 0.0 | 7.4* | 7.5* |

*statistically significant (α =0.05)

Low value → High value

FIG. 12

| Time | Free Cl (mg/L) Test Bin | Free Cl (mg/L) Test Bottle | Free Cl (mg/L) Ctrl Bin | Free Cl (mg/L) Ctrl Bottle | Total Cl (mg/L) Test Bin | Total Cl (mg/L) Test Bottle | Total Cl (mg/L) Ctrl Bin | Total Cl (mg/L) Ctrl Bottle | Combined Cl (mg/L) Test Bin | Combined Cl (mg/L) Test Bottle | Combined Cl (mg/L) Ctrl Bin | Combined Cl (mg/L) Ctrl Bottle | Free Ammonia (mg/L) Test Bin | Free Ammonia (mg/L) Test Bottle | Free Ammonia (mg/L) Ctrl Bin | Free Ammonia (mg/L) Ctrl Bottle | Monochloramine (mg/L) Test Bin | Monochloramine (mg/L) Test Bottle | Monochloramine (mg/L) Ctrl Bin | Monochloramine (mg/L) Ctrl Bottle | pH Test Bin | pH Test Bottle | pH Ctrl Bin | pH Ctrl Bottle |
|---|---|---|---|---|---|---|---|---|---|---|---|---|---|---|---|---|---|---|---|---|---|---|---|---|
| Initial | 0.0 | | 0.0 | | 5.8 | | 5.7 | | 5.8 | | 5.7 | | 0.1 | | 0.6 | | 5.4 | | 5.1 | | 7.6 | | 7.6 | |
| 1min* | 0.0 | | 0.0 | | 5.6 | | 5.6 | | 5.6 | | 5.6 | | 0.9 | | 0.8 | | 4.7 | | 4.9 | | 7.5 | | 7.6 | |
| 30min* | 0.0 | | 0.0 | | 5.6 | | 5.4 | | 5.6 | | 5.4 | | 0.9 | | 0.6 | | 4.6 | | 4.6 | | 7.4 | | 7.7 | |
| 1hr* | 0.0 | | 0.0 | | 5.5 | | 5.5 | | 5.5 | | 5.5 | | 0.9 | | 0.8 | | 4.5 | | 4.5 | | 7.5 | | 7.7 | |
| 12hr | 0.0 | 0.0 | 0.0 | 0.0 | 4.7 | 4.9 | 4.8 | 4.9 | 4.7 | 4.9 | 4.8 | 4.9 | 0.3 | 0.2 | 0.2 | 0.1 | 4.4 | 4.6 | 4.6 | 4.9 | 7.5 | 7.5 | 7.6 | 7.6 |
| 12.5hr | 0.0 | 0.0 | 0.0 | 0.0 | 4.3 | 4.5 | 4.8 | 4.9 | 4.3 | 4.5 | 4.8 | 4.9 | 0.4 | 0.2 | 0.2 | 0.0 | 4.4 | 4.6 | 4.6 | 4.8 | 7.5 | 7.5 | 7.6 | 7.6 |
| 13hr | 0.0 | 0.0 | 0.0 | 0.0 | 4.5 | 4.6 | 4.6 | 4.8 | 4.5 | 4.6 | 4.6 | 4.8 | 0.2 | 0.1 | 0.1 | 0.1 | 4.4 | 4.6 | 4.6 | 4.7 | 7.4 | 7.5 | 7.6 | 7.5 |

*Bottle Samples taken

Low value → High value

FIG. 14

| Time (hr) | HPC Test | Time (hr) | Luminultra Control | Time (hr) | Luminultra Test | Time (hr) | EMB Control | Time (hr) | Colilert Control | Time (hr) | EMB Test | Time (hr) | Colilert Test | Time (hr) |
|---|---|---|---|---|---|---|---|---|---|---|---|---|---|---|
| 0 | 108.5273 | 0 | 271.4734 | 0 | 198.1156 | 0 | N/A | 0 | N/A | 0 | N/A | 0 | N/A | 0 |
| 0.5 | N/A | 0.5 | 256580.4 | 0.5 | 161785 | 0.5 | 1439227 | 0.5 | 1565000 | 0.5 | 1544369 | 0.5 | 1769694 | 0.5 |
| 24 | 904135 | 24 | 33686.32 | 24 | 31731.09 | 24 | 836460.8 | 24 | 924181.8 | 24 | 683103.3 | 24 | 772609.6 | 24 |
| 48 | 290524.7 | 48 | 85415.34 | 48 | 150278.6 | 48 | 258887.5 | 48 | 599969.9 | 48 | 88184.52 | 48 | 220364.1 | 48 |
| 72 | 270662.5 | 72 | 153561.2 | 72 | 251700.3 | 72 | 33324.96 | 72 | 30475.67 | 72 | 2592.521 | 72 | 3661.557 | 72 |
| 96 | 218583.6 | 96 | 109078.8 | 96 | 146439.7 | 96 | 1183.948 | 96 | 10930.63 | 96 | 47.17106 | 96 | 29.42613 | 96 |

*FIG. 15*

ELECTROMAGNETIC FLUID TREATMENT APPARATUS

TECHNICAL FIELD

The present disclosure relates to the treatment of fluid and, in particular, to the treatment of water using electromagnetism.

BACKGROUND

Hard water containing high levels of calcium, magnesium, and various other elements or minerals tends to form scale deposits on the inside surfaces of plumbing and other fluid circulation systems. Scale deposits can have detrimental effects on such systems, including restricted fluid flow, impaired efficiency, galvanic corrosion, and overheating, among others. Treatment of fluids such as hard water with electromagnetism has been shown to reduce scale formation.

U.S. Pat. App. Pub. No. 2015/0344334, entitled "Electromagnetic Fluid Treatment Apparatus," which is a publication of U.S. patent application Ser. No. 14/724,783 filed on May 28, 2015 by John Robert Lersch is incorporated herein in entirety. In that application, an electromagnetic fluid treatment device is presented for treatment of water flowing through pipes, tubes, or other conduits. Although the apparatus in that system does treat water flowing through water conduits and channels, it does not fully address treatment of bodies of water, including holding tanks, swimming pools, water features, and the like.

Calcium or sodium hypochlorite are the most common disinfectants for bodies of waters due to cost and disinfection properties. Bodies of water, such as pools and holding tanks are "breakpoint" chlorinated to maintain a free available chlorine residual for disinfection. The breakpoint is the point at which all chlorine demand is met. Additional chlorine results as free available chlorine. Contaminants added to a pool result in a "chlorine demand." If the contaminant is ammonia, chloramine species are formed adding to chlorine demand as a form of combined chlorine.

SUMMARY

Embodiments described herein relate to apparatus and methods for treating bodies of fluid. In an embodiment an apparatus includes a first rod spacer comprising a first rod aperture. Such an apparatus may also include a second rod spacer comprising a second rod aperture, the first rod aperture and the second rod aperture being circumferentially aligned about a centerline axis. Further, the apparatus may include a conductive rod extending between the first rod spacer and the second rod spacer, a first portion of the conductive rod being engaged with the first rod aperture and a second portion of the conductive rod being engaged with the second rod aperture, the conductive rod being configured to generate a magnetic field in response to an electrical current applied to the conductive rod, wherein the conductive rod is submersible in a body of chlorinated fluid for treatment of the body of fluid with the magnetic field.

In an embodiment a system includes an electromagnetic fluid treatment apparatus comprising a first rod spacer comprising a first rod aperture. Such an apparatus may also include a second rod spacer comprising a second rod aperture, the first rod aperture and the second rod aperture being circumferentially aligned about a centerline axis. Further, the apparatus may include a conductive rod extending between the first rod spacer and the second rod spacer, a first portion of the conductive rod being engaged with the first rod aperture and a second portion of the conductive rod being engaged with the second rod aperture, the conductive rod being configured to generate a magnetic field in response to an electrical current applied to the conductive rod, wherein the conductive rod is submersible in a body of chlorinated fluid for treatment of the body of fluid with the magnetic field. Additionally, the system may include a power supply configured to provide the electrical current to the conductive rod.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

FIG. 12 is a table of test data representative of results of the test of FIG. 10.

FIG. 14 is a table of test data representative of the results of the test of FIG. 13.

FIG. 15 is a table of test data representative of experimental tests performed on an embodiment of an electromagnetic fluid treatment apparatus.

DETAILED DESCRIPTION

The detailed description of various embodiments herein refers to the accompanying drawings, which show various embodiments by way of illustration. While these various embodiments are described in sufficient detail to enable those skilled in the art to practice the disclosure, it should be understood that other embodiments may be realized, and that logical, chemical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, the apparatus and assemblies may find particular use in connection with electromagnetic treatment of water. However, various aspects of the disclosed embodiments may be adapted for optimized performance with a variety of fluids and with a variety of fluid communication and/or circulation systems. As such, numerous applications of the present disclosure may be realized.

Embodiments described herein relate to apparatus and methods for treating bodies of standing water. In various embodiments, an electromagnetic fluid treatment assembly may comprise one or more conductive rods. Application of electrical current to one or more of the conductive rods may generate magnetic fields that circulate through the fluid. In various embodiments, a plurality of magnetic fields are generated such that all fluid passing through the electromagnetic fluid treatment assembly passes through a generated magnetic field.

Figure 1:
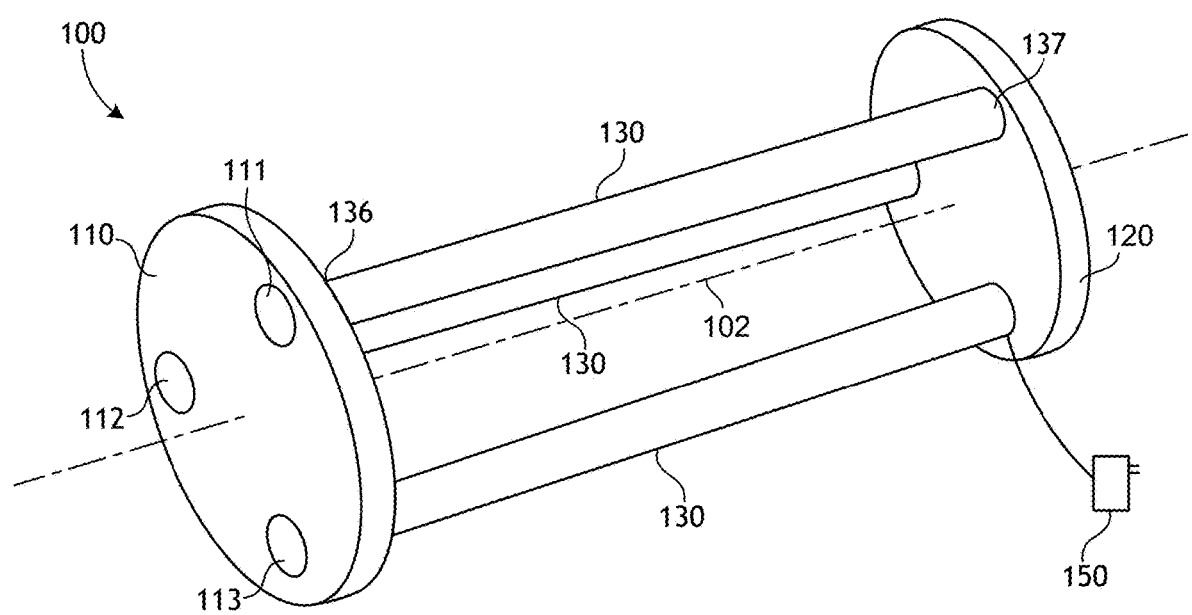
FIG. 1 illustrates a perspective view of an electromagnetic fluid treatment apparatus.
Figure 2:
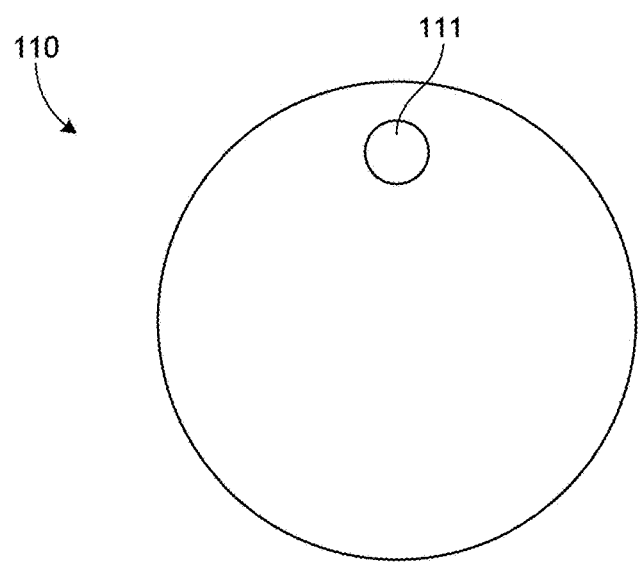
FIG. 2 illustrates an end view of a rod spacer.

In various embodiments and with reference to FIG. 1, an electromagnetic fluid treatment apparatus 100 may comprise a first rod spacer 110 and a second rod spacer 120. Rod spacers 110, 120 may be oriented about a centerline axis. As used herein, references to axial, radial, and circumferential positions and/or distances refer to positions relative to centerline axis 102.

In various embodiments, rod spacers 110, 120 may comprise a non-conductive material. For example, in various embodiments, rod spacers 110, 120 may comprise polypropylene, polyethylene, or any other non-conductive polymer or plastic. However, in various embodiments, rod spacers 110, 120 may comprise any non-conductive material suitable for use in an electromagnetic fluid treatment apparatus.

In various embodiments, rod spacers 110, 120 may be configured to receive at least one conductive rod 130. In various embodiments, rod spacers 110, 120 may be configured to hold the conductive rod(s) 130 in a particular position relative to other portions of the one or more conductive rods 130.

In various embodiments, rod spacers 110, 120 may further comprise at least one rod aperture 111, 112, 113 extending axially through rod spacers 110, 120. In an alternative embodiment, rod apertures 111, 112, 113 may be replaced with rod receivers, such as indentions, clips, or the like, that do not extend entirely through the rod spacers. In various embodiments, rod apertures 111, 112, 113 may be disposed at substantially equal radial distances from centerline axis. Stated differently, rod apertures 111, 112, 113 may be radially aligned about a centerline axis.

Figure 3:
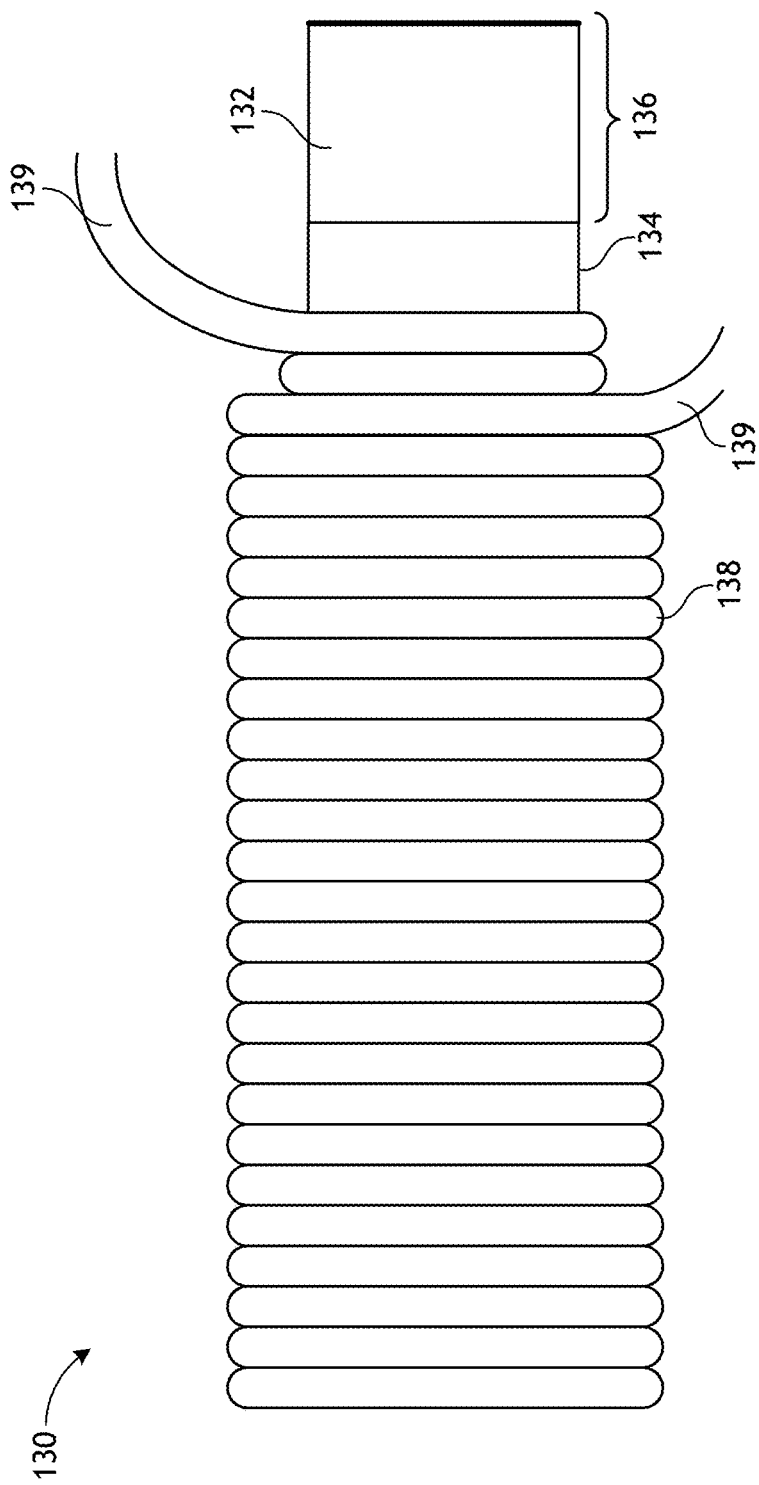
FIG. 3 illustrates a partial side view of a conductive rod.

In various embodiments, electromagnetic fluid treatment apparatus 100 may comprise at least one conductive rod 130 disposed between, and coupled to, first rod spacer 110 and second rod spacer 120. With reference to FIGS. 1 and 3, conductive rod 130 may comprise a core 132. In various embodiments, core 132 may comprise a solid cylinder. However, in various embodiments, core 132 may comprise any suitable shape for use in an electromagnetic fluid treatment apparatus.

In various embodiments, a solid core may increase the strength and/or alter the shape of a magnetic field generated by electromagnetic fluid treatment apparatus 100. For example, in various embodiments, an axially elongated toroid-shaped magnetic field may be generated by electromagnetic fluid treatment apparatus 100. In various embodiments, an axially elongated toroid-shaped magnetic field may treat fluid with a more uniform and more stable magnetic field.

Core 132 may comprise a conductive metal such as cold rolled steel. However, in various embodiments, core 132 may comprise copper, aluminum, nickel, or any other metal, metal alloy, or other material suitably conductive for use in an electromagnetic fluid treatment apparatus.

In various embodiments, conductive rod 130 may further comprise a non-conductive layer 134. Non-conductive layer 134 may be wrapped around an outer circumference of core 132. In various embodiments, non-conductive layer 134 may be configured to at least partially surround core 132. For example, in various embodiments, non-conductive layer 134 may extend from a proximal, axial end of core 132 to a distal, axial end of core 132.

In various embodiments, non-conductive layer 134 may extend only partially between the proximal, axial end of core 132 and the distal, axial end of core 132. Stated differently, non-conductive layer may be disposed or set back by an axial distance from the proximal and distal axial ends of core 132. For example, in various embodiments, conductive rod 130 may further comprise a first attachment portion 136 and a second attachment portion 137. First attachment portion 136 may comprise a portion of core 132 disposed at the proximal, axial end of core 132 that is not surrounded by non-conductive layer 134. Stated differently, first attachment portion 136 may comprise an exposed core 132 of conductive rod 130. Second attachment portion 137 may comprise a portion of core 132 disposed at the distal, axial end of core 132 that is not surrounded by non-conductive layer 134. Stated differently, second attachment portion 137 may comprise an exposed core 132 of conductive rod 130. In various embodiments, attachment portions 136, 137 may comprise an axial length of 25.4 millimeters. However, attachment portions 136, 137 may comprise any suitable axial length.

In various embodiments, non-conductive layer 134 may comprise a non-conductive material. For example, in various embodiments, non-conductive layer 134 may comprise polypropylene, polyethylene, or any other non-conductive polymer or plastic. However, in various embodiments, non-conductive layer 134 may comprise any non-conductive material suitable for use in an electromagnetic fluid treatment apparatus.

Conductive rod 130 may further comprise a wire coil 138 disposed about the outer circumference of core 132. In various embodiments, wire coil 138 may be disposed radially outward of non-conductive layer 134. In various embodiments, wire coil 138 may comprise a metal wire wound tightly about core 132 such that a coil extends helically about the circumference of the core 132 and axially along core 132. In various embodiments, wire coil 138 may be wrapped upon itself around core 132 so that wire coil 138 begins and ends at substantially the same axial location relative to core 132. In various embodiments, wire coil 138 may be wrapped upon itself until at least two layers of wire are formed. In various embodiments, wire coil 138 may be wound to a radial thickness of about 3 millimeters, for example 3.175 millimeters. However, wire coil 138 may comprise any radial thickness suitable for use in an electromagnetic fluid treatment apparatus.

In various embodiments, wire coil 138 may extend from first attachment portion 136 to second attachment portion 137. In various embodiments, wire coil 138 may extend only partially between first attachment portion 136 and second attachment portion 137. Stated differently, wire coil 138 may be disposed or set back by an axial distance from a proximal, axial end of non-conductive layer 134 and/or a distal, axial end of non-conductive layer 134. In various embodiments, wire coil 138 may be disposed or set back the proximal and distal axial ends of core 132 by an axial distance of about 30 millimeters, for example 28.575 millimeters.

In various embodiments, wire coil 138 may comprise copper. However, in various embodiments, wire coil 138 may comprise any conductive metal, metal alloy, composite, or other material suitable for use in an electromagnetic fluid treatment apparatus.

In various embodiments, wire coil 138 may comprise at least one uncoiled wire portion 139. Uncoiled wire portion 139 may be disposed at a distal end or a proximal end of wire coil 138. In various embodiments, uncoiled wire portion 139 may be continuous with wire coil 138, but may not extend helically around a circumference of core 132. In various embodiments, wire coil 138 may be electrically connected to other portions of electromagnetic fluid treatment apparatus 100.

Figure 4A:
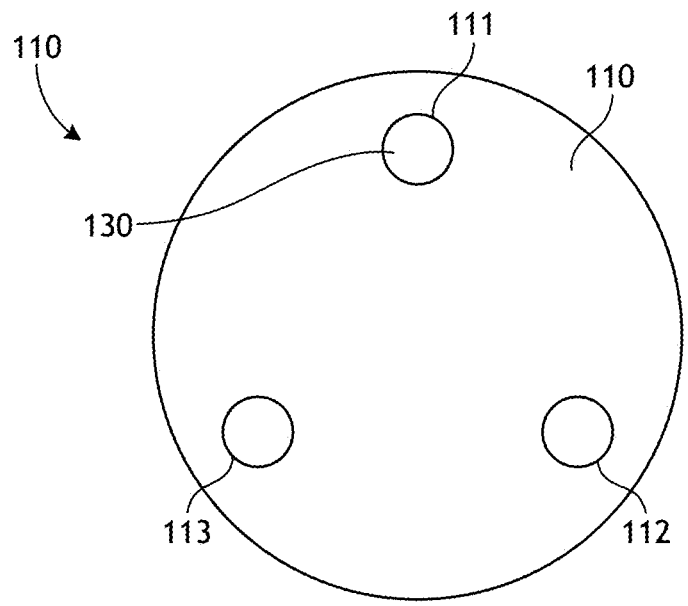
FIG. 4A illustrates an end view of an embodiment of a rod spacer.

In various embodiments and with reference to FIGS. 1 and 4A, electromagnetic fluid treatment apparatus 100 may comprise a plurality of conductive rods 130 disposed between, and coupled to, first rod spacer 110 and second rod spacer 120. For example, electromagnetic fluid treatment apparatus 100 may comprise three conductive rods 130. For example, in various embodiments, a first conductive rod may be disposed in a first rod aperture 111 of rod spacers 110, 120, a second conductive rod may be disposed in a second rod aperture 112 of rod spacers 110, 120, and a third conductive rod may be disposed in a third rod aperture 113 of rod spacers 110, 120.

In various embodiments, conductive rods 130 may be disposed at substantially equal radial distances from centerline axis and may be substantially parallel to centerline axis. Stated differently, conductive rods 130 may be radially aligned about centerline axis. In various embodiments, conductive rods 130 may be disposed circumferentially about centerline axis at substantially equal intervals. For example, in various embodiments comprising three conductive rods 130, each conductive rod may be disposed 120 degrees away from conductive rods 130 circumferentially adjacent thereto.

Figure 4B:
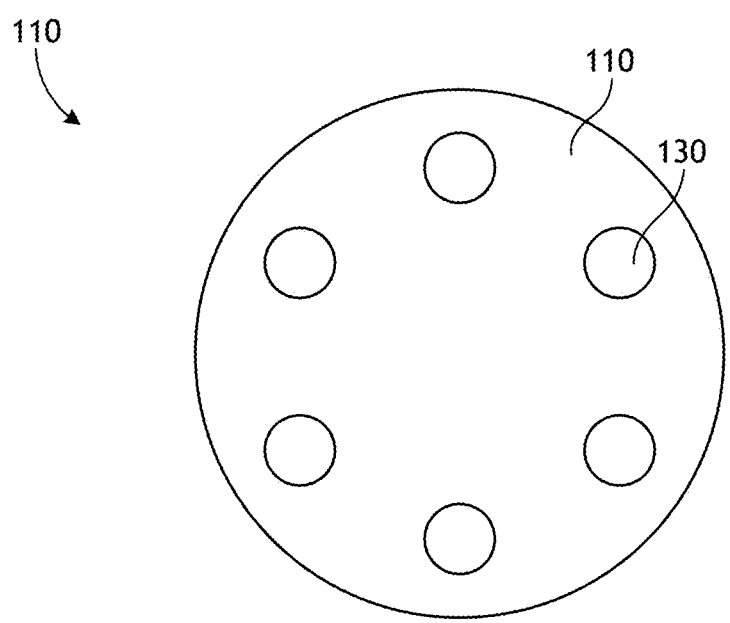
FIG. 4B illustrates an end view of an embodiment of a rod spacer.

In various embodiments and with reference to FIG. 4B, electromagnetic fluid treatment apparatus 412 may comprise a first rod spacer 110 comprising six rod apertures, a second rod spacer comprising six rod apertures, and six conductive rods 130 disposed therebetween. In various embodiments, electromagnetic fluid treatment apparatus 414 may comprise any number of conductive rods disposed between a first rod spacer and a second rod spacer.

Figure 5:
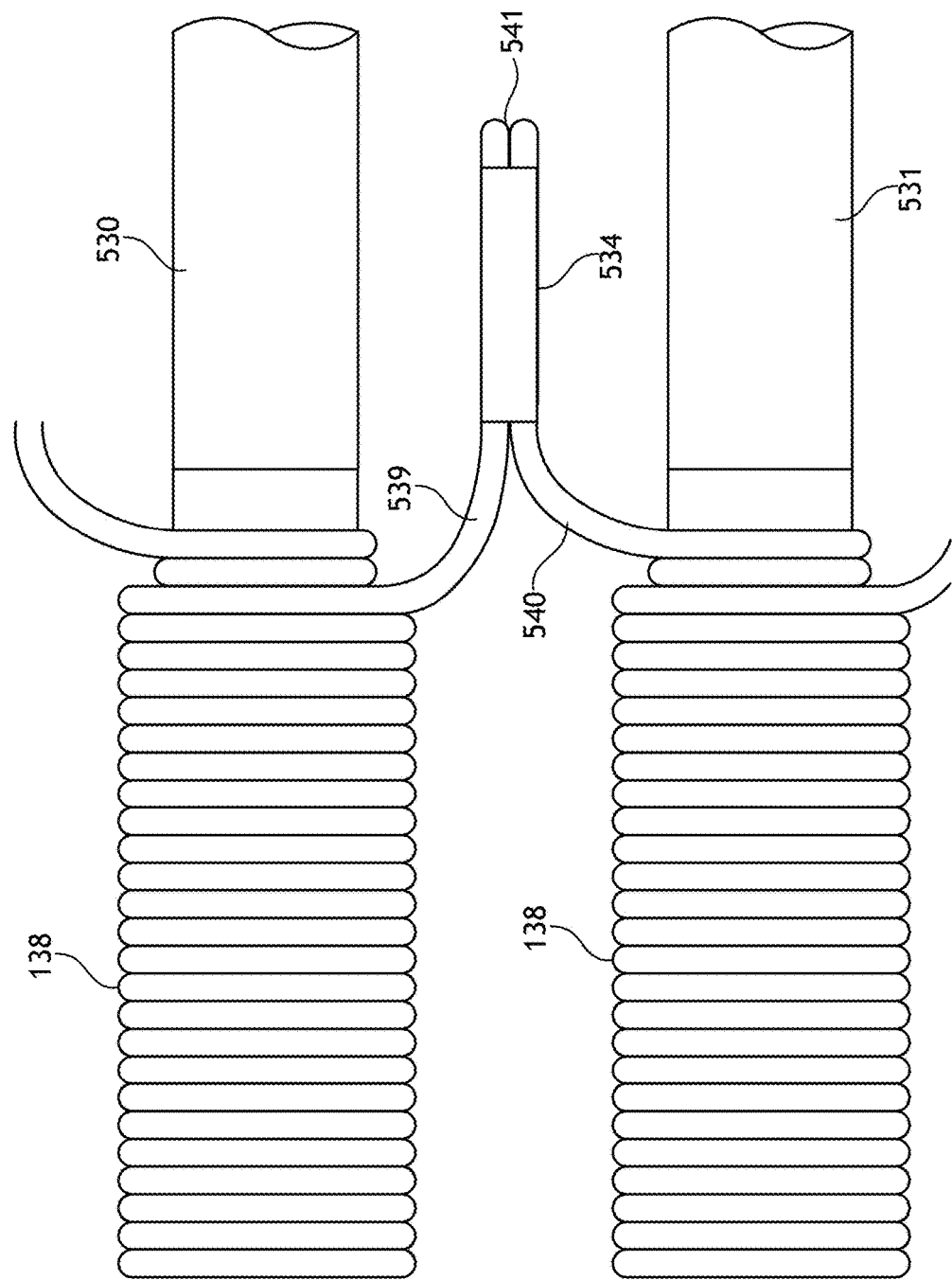
FIG. 5 illustrates a partial side view of a portion of conductor rods.

In various embodiments and with reference to FIG. 5, a first conductive rod 530 may be electrically connected to a second conductive rod 531. In various embodiments, a plurality uncoiled wire portion 539 of the first conductive rod 530 may be electrically connected to a second uncoiled wire portion 540 of the second conductive rod 531 by soldering, crimping, clamping, or the like to form a joined wire portion 541. In various embodiments, conductive rods may be electrically connected such that in response to an electrical current passing through wire coil 138, magnetic fields having similarly oriented polarity will be generated around each conductive rod.

In various embodiments, a non-conductive insulating material 534 may at least partially surround joined wire portion 541. In various embodiments non-conductive insulating material 534 may comprise a non-conductive material. For example, in various embodiments, non-conductive insulating material 534 may comprise polypropylene, polyethylene, or any other non-conductive polymer or plastic. However, in various embodiments, non-conductive insulating material 534 may comprise any non-conductive material suitable for use in an electromagnetic fluid treatment apparatus.

In some embodiments, all of the conductive rods 130 may be electrically coupled to power. Alternatively, only a single conductive rod 130 may be electrically coupled to power, and the other conductive rods 130 may be passive. In such an embodiment, the passive rods may be positioned such that they receive power through electromagnetic modes of mutual inductance with the powered conductive rod 130. In other embodiments, a combination of a plurality of powered conductive rods 130 and passive conductive rods 130 may arranged to direct, reflect, or otherwise enhance the electrical radiation patters of the powered conductive rods 130.

In various embodiments and with reference again to FIG. 1, electromagnetic fluid treatment apparatus 100 may further comprise a power element 150. Power element 150 may comprise a battery, electrical plug, or other suitable power source. In various embodiments, power element 150 may provide direct current (DC) power. In various embodiments, power element 150 may provide from about 2.5 amps to about 3 amps of current to one or more conductive rods 130. In an embodiment, the power element 150 may provide 12V power at a current range of 1 A to 10 A. The power element 150 may operate at an input of alternating current (AC) 110V or 220V. In some embodiments, the power element 150 may operate at a frequency in a range of 10 Hz to 500 Hz. Alternatively, the power element 150 may include a frequency generator component configured to supply power at a variable frequency or variable waveform for enhancement of the electromagnetic operation of the apparatus. The power element 150 may further include electrical safeguards configured to protect against short circuit, overload, or over voltage. Such safeguards may include ground fault circuit interrupter (GFCI) components, circuit breaker components, or current limiters, surge protectors, or other electrical safety equipment. In an embodiment, the power element 150 may also include, or be electrically coupled to, one or more capacitors, such as electrolytic capacitors. In an embodiment, the capacitors may be 220 F capacitors.

Figure 6:
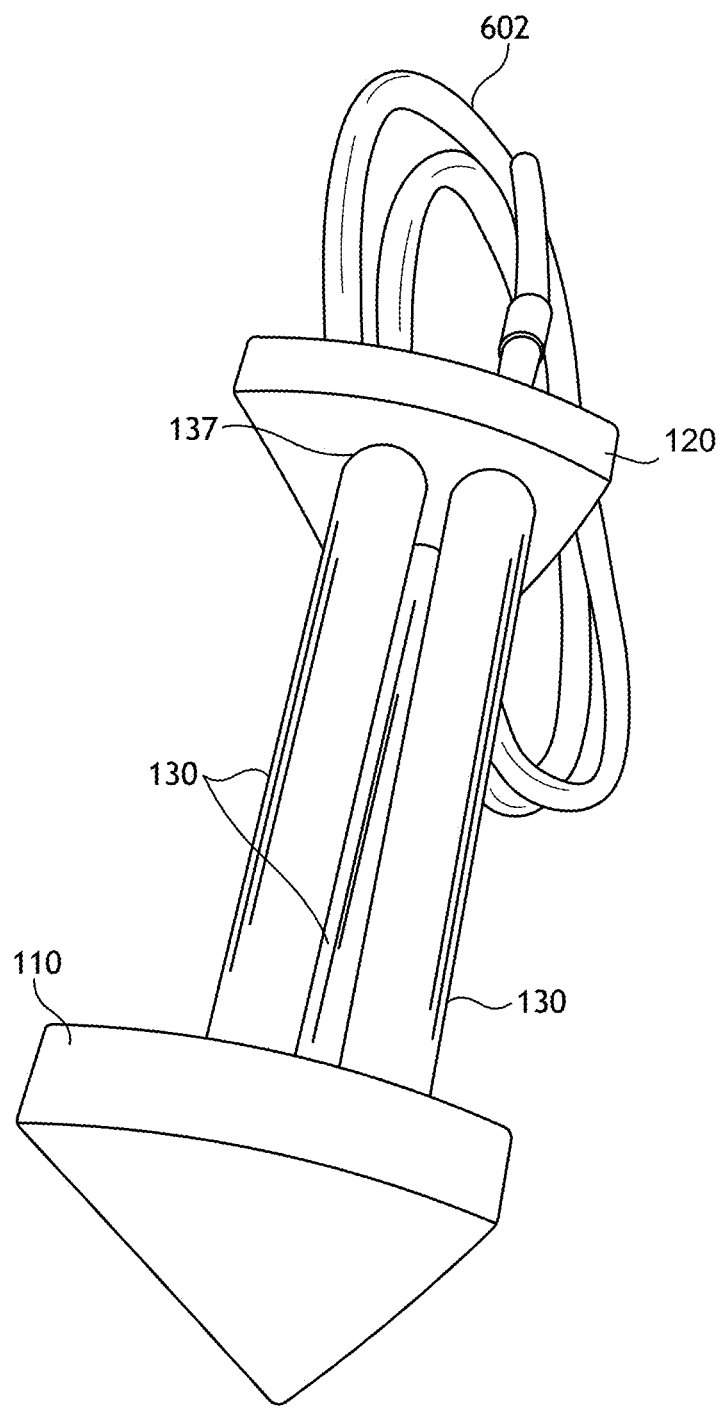
FIG. 6 illustrates a perspective view of an embodiment of an electromagnetic fluid treatment apparatus.

In an embodiment, described in FIG. 6, the first rod spacer 110 may have an alternative geometry, such as a substantially triangular geometry, hexagonal geometry, or the like. One of ordinary skill will recognize a variety of geometries that may be suitable. In such an embodiment, the electromagnetic fluid treatment apparatus 100 may include a power cord 602 for electrically connecting the conductive rod(s) 130 to the power element 150. In an embodiment, the power cord 602 may include a waterproof shroud or liner with a waterproof coupling configured to avoid electrical short of wires internal to the power cord 602 when the electromagnetic fluid treatment apparatus 100 is submersed in fluid.

Figure 7:
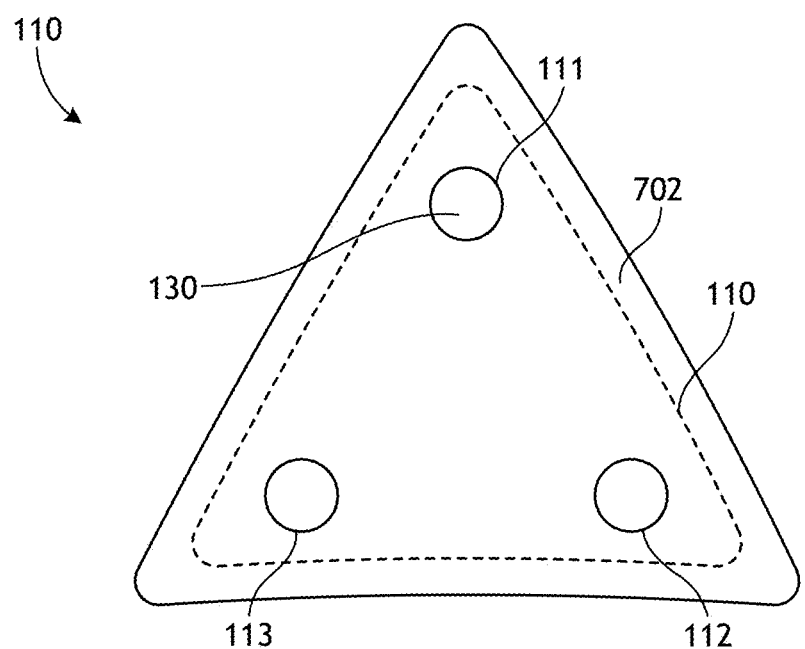
FIG. 7 illustrates a first end view of a rod spacer with a bumper.
Figure 8:
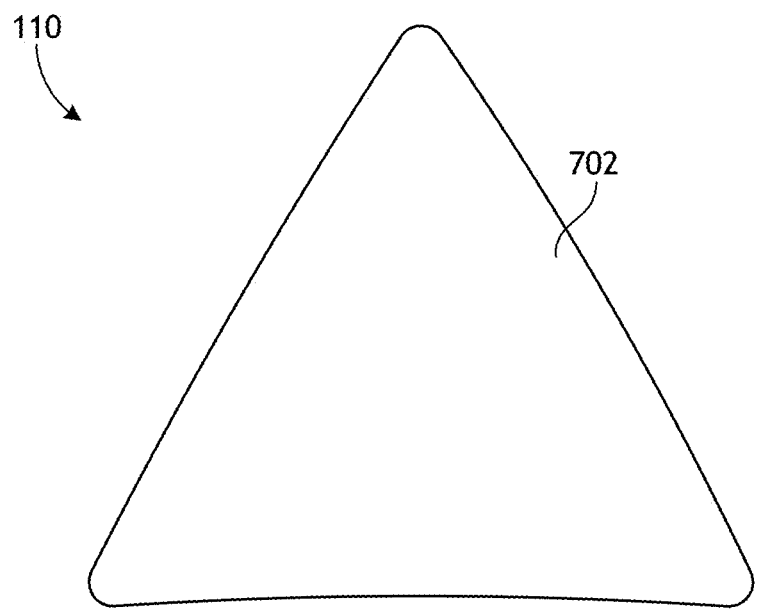
FIG. 8 illustrates a second end view of a rod spacer with a bumper.

As illustrated in FIG. 7, the rod spacer 110 may include a bumper 702 to protect against damage to the rod spacer 110 and to protect against damage to surrounding surfaces, such as pool surfaces. In an embodiment, the surround 702 may be formed of rubber, plastic, silicon, or synthetic polymer materials. One of ordinary skill will recognize a variety of suitable bumper material. In one such embodiment, the rod spacer 110 may be encased in the bumper 702. In such an embodiment, a bottom end of the rod spacer 110 may be completely covered by the bumper 702 as illustrated in FIG. 8, thereby allowing the electromagnetic fluid treatment apparatus 100 to be placed on a bottom surface of a body of fluid, such as at the bottom of a pool, without damaging the surface upon which the apparatus 100 is positioned.

Figure 9:
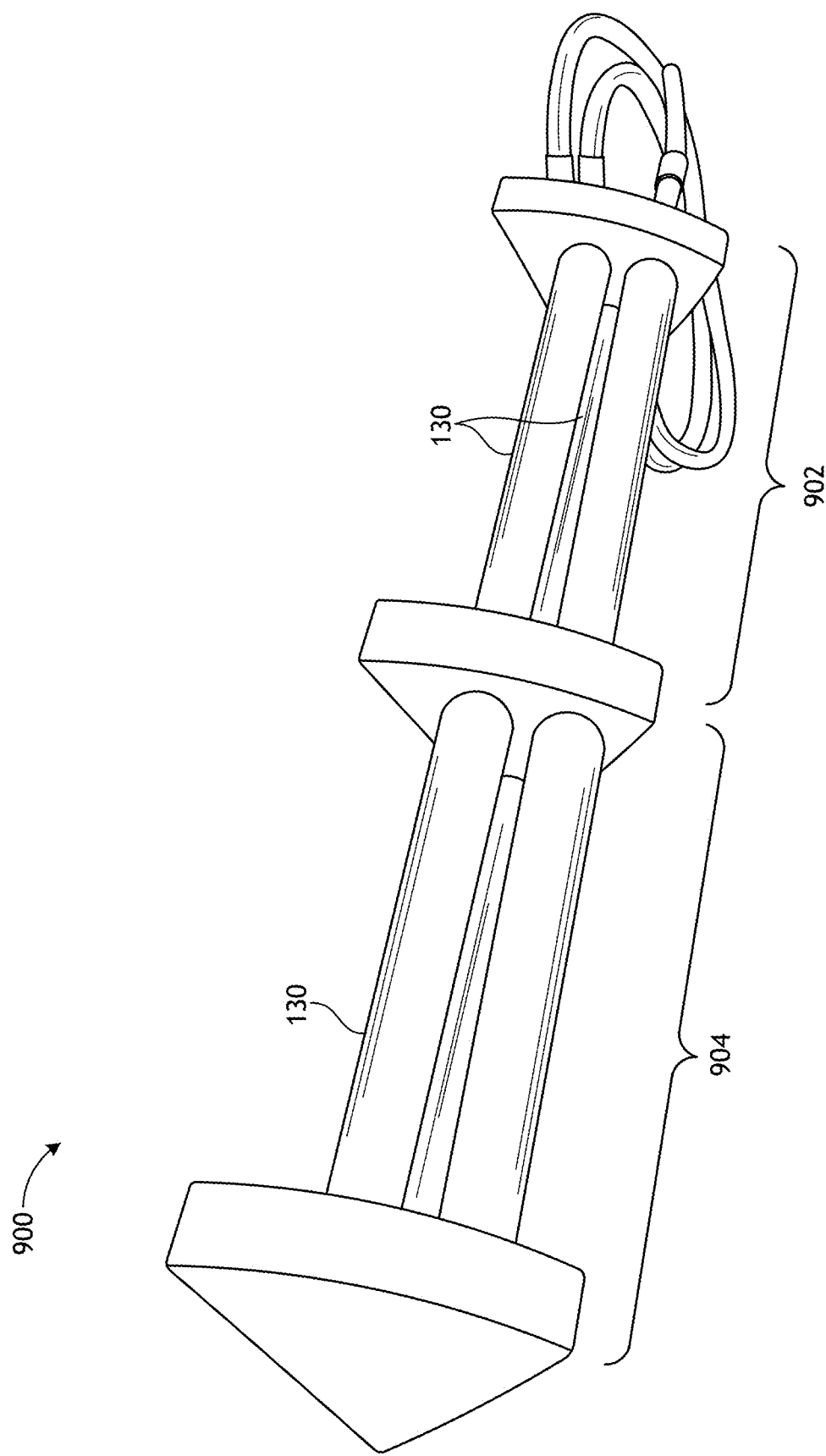
FIG. 9 illustrates a perspective view of an embodiment of an electromagnetic fluid treatment assembly.

FIG. 9 illustrates a further assembly having a first segment 902 and a second segment 904, each segment including one or more rod spacers 110 and one or more conductive rods 130. In an embodiment, the first segment 902 and the second segment 904 may be aligned along the same central axis. In such an embodiment, the first segment 902 and the second segment 904 may include one or more rod spacers 110 with bumpers 702 as illustrated in FIGS. 8 and 9.

In various embodiments, at least one magnetic field is generated in response to conducting electrical current through a wire coil of electromagnetic fluid treatment assembly 600. In various embodiments, a plurality of adjacent and/or overlapping magnetic fields is generated so as to expose all fluid traveling through the fluid pipe to a magnetic field. In various embodiments, the polar orientation of adjacent electromagnetic fluid treatment apparatuses may be identical. In various embodiments, the polar orientation of adjacent electromagnetic fluid treatment apparatuses may be different.

EXAMPLES

Figure 10:
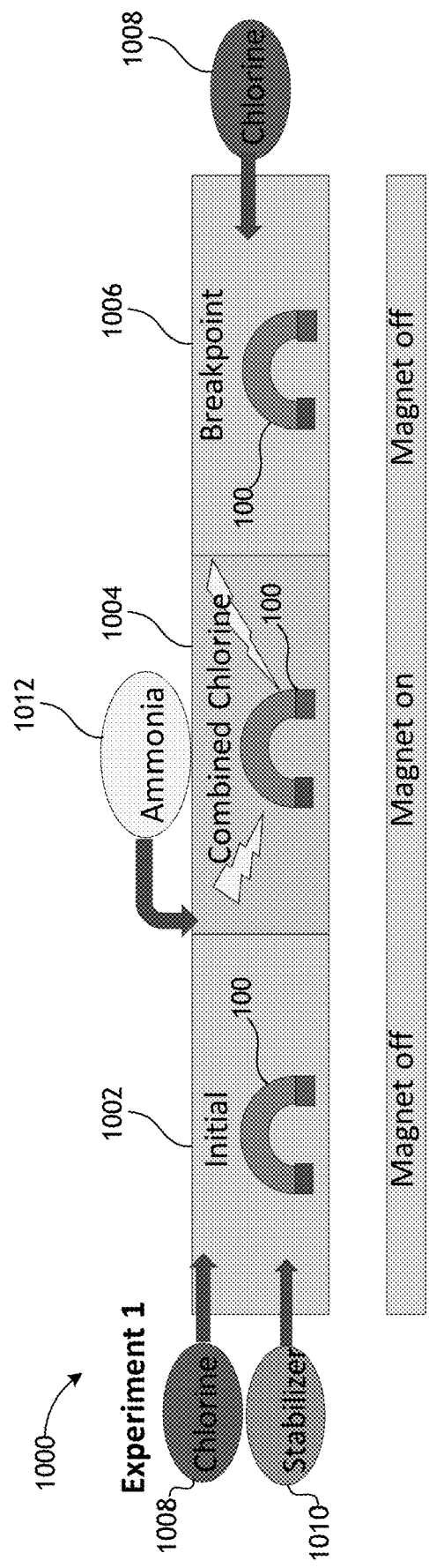
FIG. 10 illustrates an experimental test setup according to one embodiment.
Figure 11:
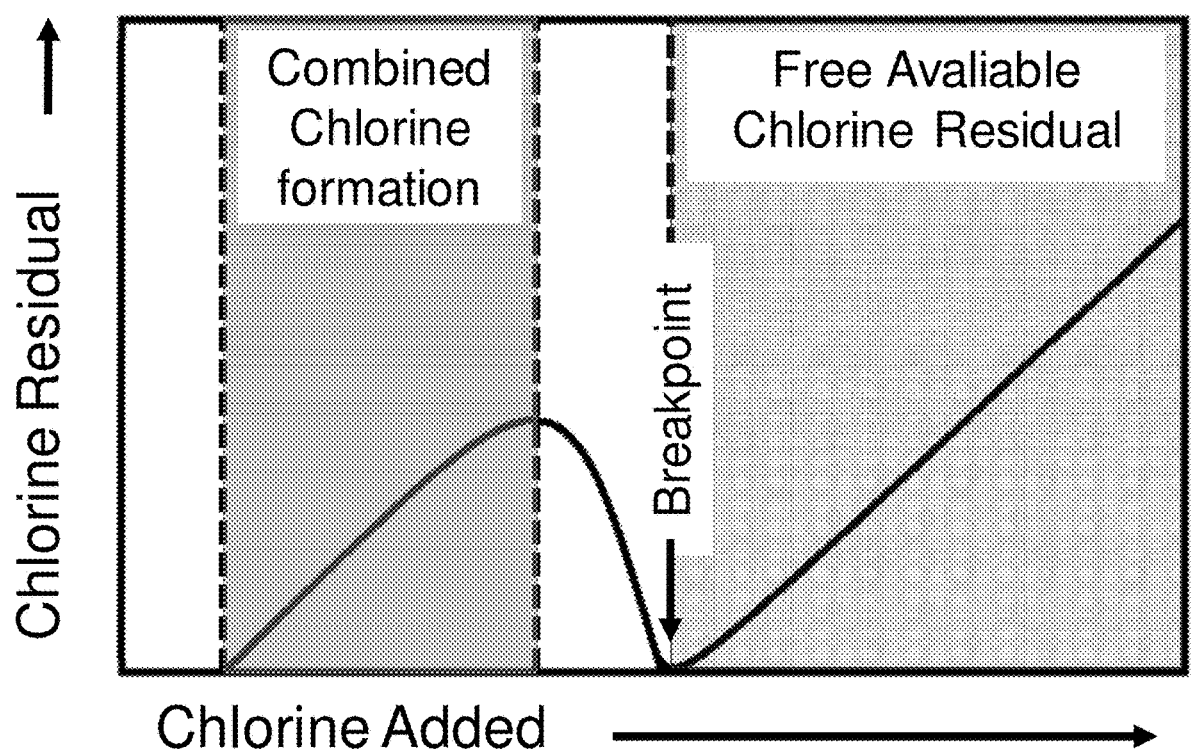
FIG. 11 is a diagram illustrating the effect on chlorine residual as a function of chlorine added to a fluid system during phases of the test illustrated in FIG. 10.

Experimental tests were performed to verify efficacy of the embodiments described herein. A first experimental setup 1000 is illustrated in FIG. 10. In the experiment of FIG. 10, an embodiment of the electromagnetic fluid treatment device 100 was submersed in a body of water. The water was pretreated with chlorine 1008 and stabilizer 1010. In an embodiment, the chlorine 1008 is calcium hypochlorite and the stabilizer 1010 is cyanuric acid. Ammonia 1012 was added in the form of ammonia nitrate as a contaminant to generate combined chlorine. Water containing the combined chlorine was exposed to a magnetic field for twenty four hours. The magnetic field was generated by the electromagnetic fluid treatment apparatus 100 submersed in the body of water. Additional chlorine was added after twenty four hours to achieve breakpoint chlorination. FIG. 11 shows the effect on chlorine residual as additional chlorine is added.

As shown in FIG. 11, when chlorine is added to contaminated water combined chlorine is formed, which adds to the chlorine demand of the system. As more chlorine is added the combined chlorine is oxidized resulting in the "breakpoint" as the combined chlorine is consumed. After the "breakpoint" additional chlorine is as a free chlorine residual and which can oxidize any additional contaminants.

FIG. 12 shows the results of the experiment illustrated in FIG. 10. The data shows that the combined chlorine (in the form of monochloramine) was reduced 11.0% over the control after exposure to an electromagnet. Additionally, the data shows that subsequent chlorination resulted in 26.9% free chlorine and 22.2% total chlorine in the test over the control. The data demonstrates the effects of a magnetic field on chlorine when exposed to ammonia and subsequently breakpoint chlorinated after 24 hrs. Combined chlorine was reduced more quickly under a magnetic field than the control. Subsequent chlorine addition resulted in a 26.9% increased free chlorine due to the previously reduced chlorine demand.

Figure 13:
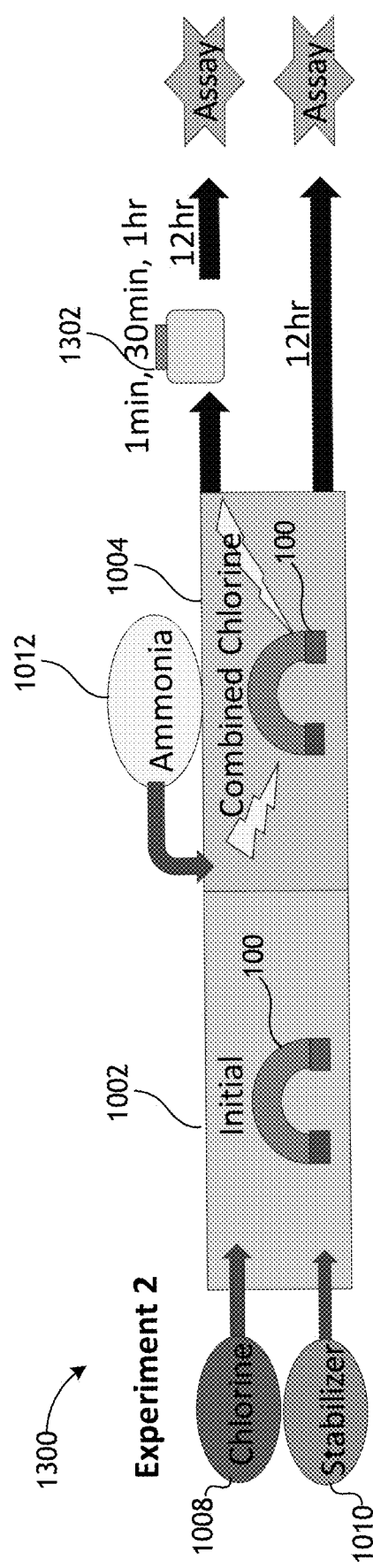
FIG. 13 illustrates another experimental test setup according to one embodiment.

FIG. 13 illustrates a second experimental setup 1300 for demonstrating the effects of exposure to electromagnetic field over time. In the second experiment, water placed in bins with combined chlorine were exposed to magnetic field over a period of thirteen hours. The water in the initial condition 1002 was pretreated with cholorine 1008 and stabilizer 1010 and the electromagnetic fluid treatment device 100 was submersed in the water. Samples 1302 were taken and held in bottles outside the magnetic field at set intervals. The bins were constantly exposed to the magnetic field. Both the bottle samples and bin samples were assayed after 12 hrs for comparison.

The results of experiment 2 are shown in FIG. 14. The data shows that less than 1 hour of exposure to a magnetic field is sufficient to see a reduction in combined chlorine. Additionally, the data shows that the mechanism of chlorine demand reduction persists outside of the magnetic field. Divergence of test and control appears to occur after 12.5 hrs in both the bottle and bins, indicating <1 hr exposure is needed for an effect.

The experiments of FIGS. 10 and 13 show that the application of a magnetic field resulted in the reduction of monochloramine, and therefore chlorine demand, in a pool system. Additionally, the results show that application of a magnetic field may allow for increased free available chlorine for use as a disinfectant. Furthermore, use of magnetic fields may enhance for chlorine disinfection of pool water.

Further experimental tests were performed on the described embodiments to determine efficacy of the apparatus for water treatment purposes. Test data associated with the test is illustrated in the table of FIG. 15. A microbial assessment of the drop-in unit was evaluated with multiple test and multiple control bins of fluid. Test bins included the apparatus described herein, and control bins did not. *E. coli* was spiked into all bins and monitored over a 96 hour period. During monitoring, the total *E. coli* and total bacteria were tracked through various quantification methods including: Luminultra biological testing, EMB testing, HPC testing, and Colilert testing. The results of each test, for each of the various methods, and for both the control and test groups are recorded by time in the table of FIG. 15.

Figure 16:
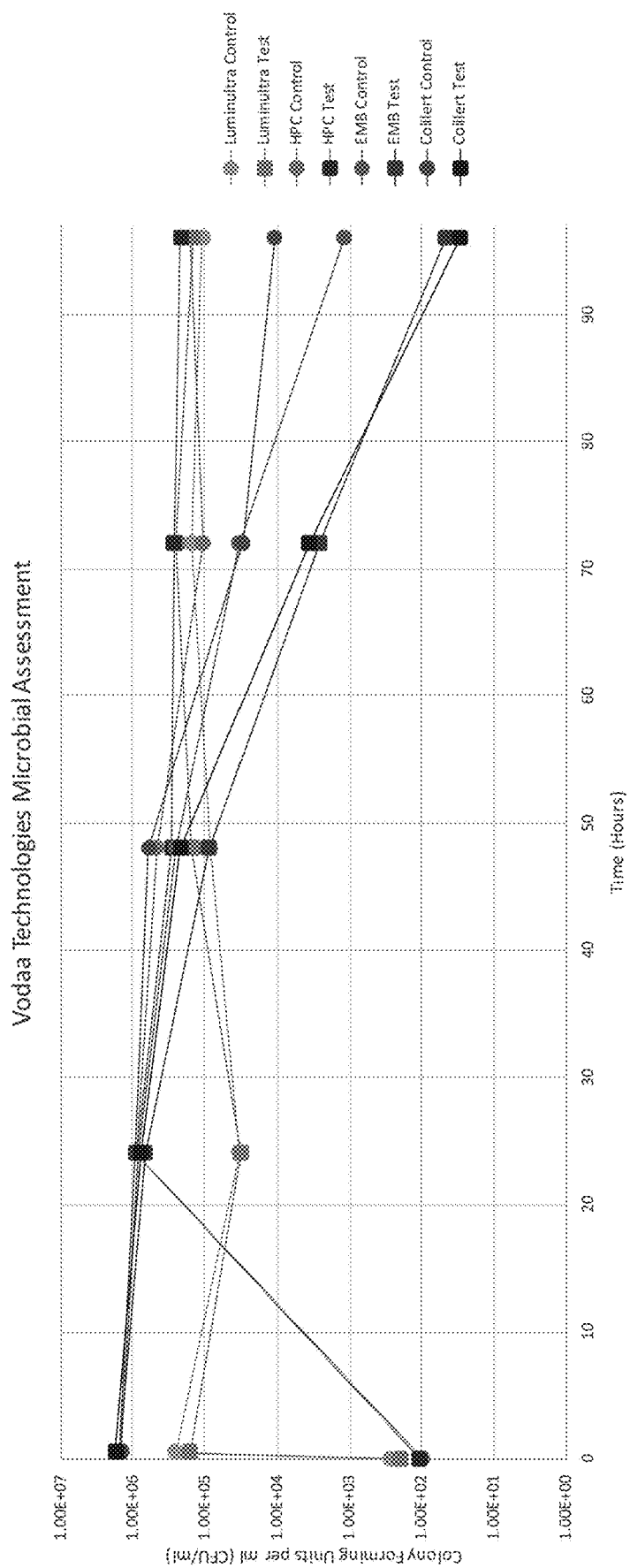
FIG. 16 is a graphical representation of the test data of FIG. 15.
Figure 17:
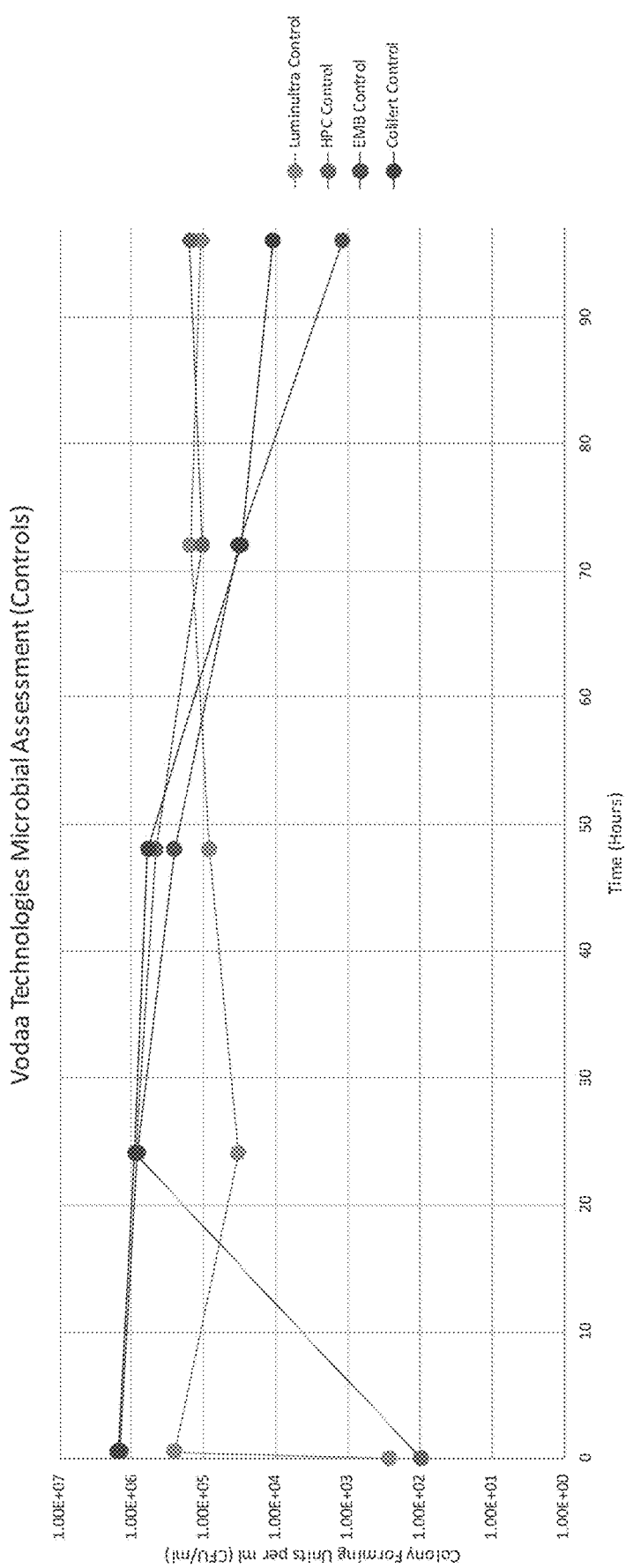
FIG. 17 is a graphical representation of control responses to tests performed with an embodiment of an electromagnetic fluid treatment apparatus.
Figure 18:
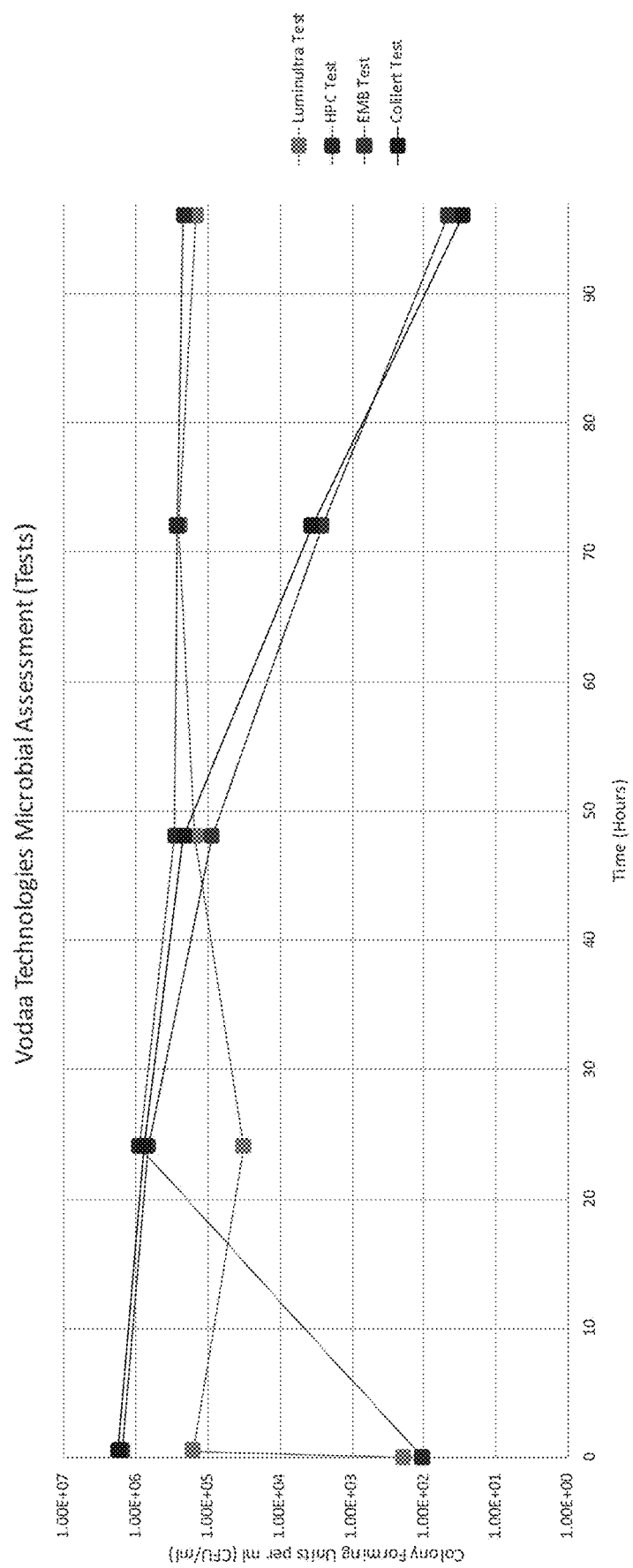
FIG. 18 is a graphical representation of variable responses to tests performed with an embodiment of an electromagnetic fluid treatment apparatus.
Figure 19:
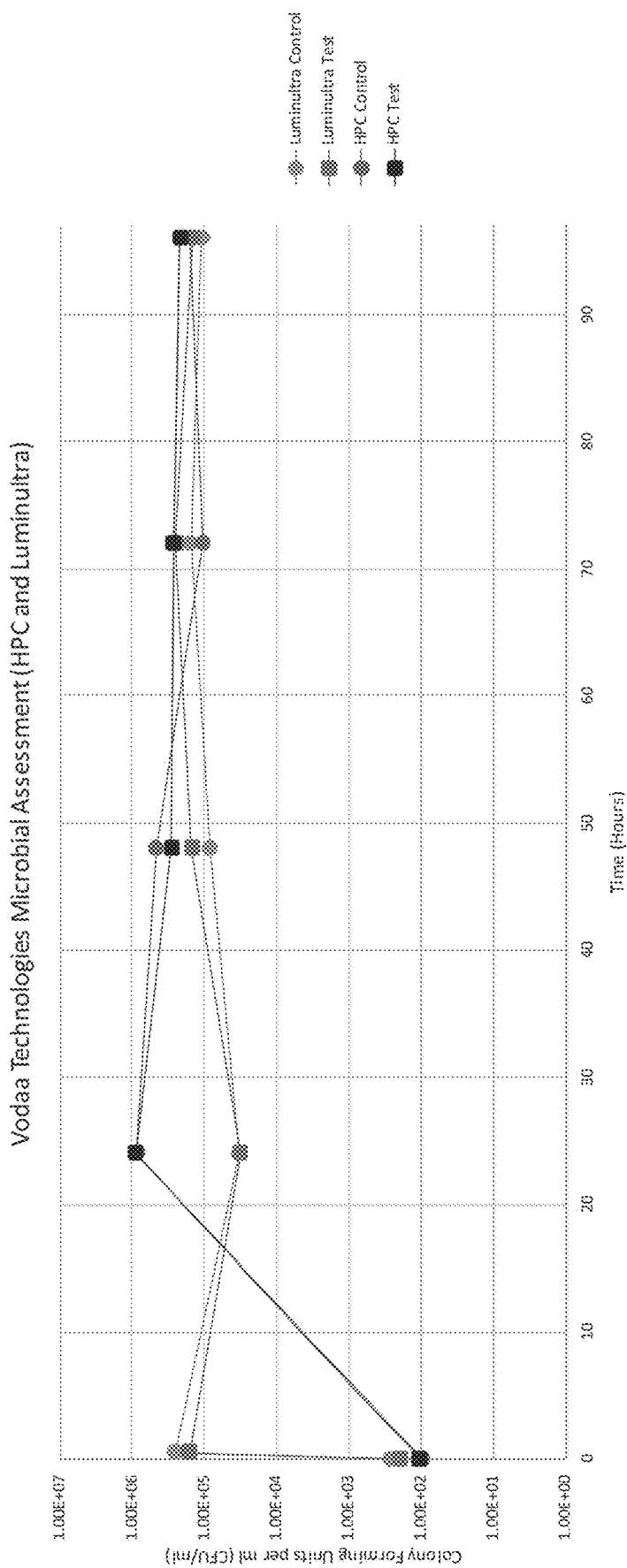
FIG. 19 is a graphical comparison of variable responses to tests performed with an embodiment of an electromagnetic fluid treatment apparatus measured by Heterotrophic Plate Count (HPC) and Luminultra measurement techniques.
Figure 20:
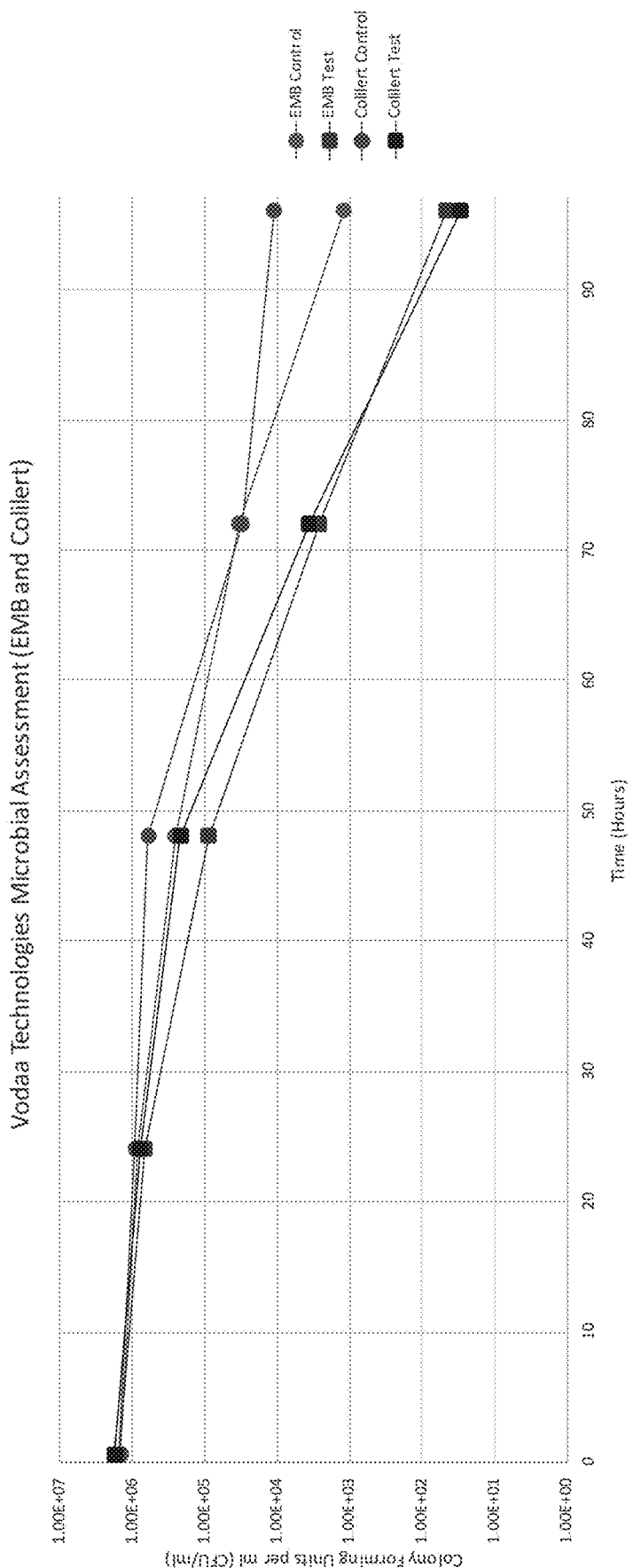
FIG. 20 is a graphical comparison of variable responses to tests performed with an embodiment of an electromagnetic fluid treatment apparatus measured by Eosin Methylene Blue (EMB) and Colilert measurement techniques.

FIGS. 16-20 are graphical representations of the data in the table of FIG. 15. FIG. 16 shows a comparison of all data, for each biological monitoring method, and for both control and test groups. The results show a marked decrease in *E. coli* over time in the test groups that include the apparatus described herein, with reference to control groups. FIG. 17 shows the data for the control groups by each monitoring method over time. FIG. 18 shows the data for the test groups by each monitoring method over time. FIG. 19 shows a comparison of HPC and Luminultra monitoring methods. FIG. 20 shows a comparison of EMB and Colilert monitoring methods.

Further observed benefits of the described apparatus and methods include controlled scale and stabilization of chlorine and bromine, which reduced the wear and cost of maintenance of hot tubs and spas. Energy savings, chemical costs, and other costs of maintenance were also observed in large scale hotel pools due to inhibition of reproduction of biological elements in the water and stabilization of chlorine. For example, in one test pool, the pool chlorinator operation time was reduced by nearly 60%, thereby saving the cost of operating the chlorinator by nearly 60%.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A submersible apparatus comprising:
   a first rod spacer comprising a first rod aperture;
   a first bumper coupled with the first rod spacer to protect against damage to surrounding surfaces from the rod spacer;
   a second rod spacer comprising a second rod aperture, the first rod aperture and the second rod aperture being circumferentially aligned about a centerline axis;
   a second bumper coupled with the second rod spacer to protect against damage to surrounding surfaces from the rod spacer;
   a conductive rod extending between the first rod spacer and the second rod spacer, a first portion of the conductive rod being engaged with the first rod aperture and a second portion of the conductive rod being engaged with the second rod aperture, the conductive rod being configured to generate a magnetic field in response to an electrical current applied to the conductive rod;
   a power cord with a waterproof shroud coupled to the conductive rod; and
   wherein the conductive rod is configured to be submersible within a body of chlorinated fluid for treatment of the body of fluid with the magnetic field.

2. The apparatus of claim 1, wherein the conductive rod further comprises a core.

3. The apparatus of claim 2, wherein the core comprises a conductive material.

4. The apparatus of claim 2, further comprising a conductive coil disposed about an outer circumference of the core.

5. The apparatus of claim 4, further comprising a non-conductive layer disposed between a surface of the core element and the conductive coil.

6. The apparatus of claim 1, further comprising a plurality of conductive rods disposed between the first rod spacer and the second rod spacer.

7. The apparatus of claim 6, wherein the plurality of conductive rods are disposed about a centerline axis.

8. The apparatus of claim 6, wherein at least one of the plurality of conductive rods is not directly connected to power, and is arranged in a passive relationship with at least one of the plurality of conductive rods that is electrically coupled to power.

9. The apparatus of claim 6, comprising a first segment comprising the plurality of conductive rods and a second segment comprising a second plurality of conductive rods, the first segment being coupled to the second segment.

10. The apparatus of claim 9, wherein the first segment and the second segment share at least one of the first rod spacer or the second rod spacer.

11. A submersible system comprising:
    an electromagnetic fluid treatment apparatus comprising:
      a first rod spacer comprising a first rod aperture;
      a second rod spacer comprising a second rod aperture, the first rod aperture and the second rod aperture being circumferentially aligned about a centerline axis; and
      a conductive rod extending between the first rod spacer and the second rod spacer, a first portion of the conductive rod being engaged with the first rod aperture and a second portion of which being engaged with the second rod aperture, the conductive rod being configured to generate a magnetic field in response to an electrical current being applied to the conductive rod;
      a bumper to protect against damage to, and coupled with, one or more of the first rod spacer and the second rod spacer;
    wherein the conductive rod is submersible in a body of fluid for treatment of the body of fluid with the magnetic field; and
    a waterproof power supply configured to provide the electrical current to the conductive rod.

12. The system of claim 11, wherein the conductive rod further comprises a core.

13. The system of claim 12, wherein the core comprises a conductive material.

14. The system of claim 12, further comprising a conductive coil disposed about an outer circumference of the core.

15. The system of claim 14, further comprising a non-conductive layer disposed between a surface of the core and the conductive coil.

16. The system of claim 11, further comprising a plurality of conductive rods disposed between the first rod spacer and the second rod spacer.

17. The system of claim 16, wherein the plurality of conductive rods are disposed about a centerline axis.

18. The system of claim 16, wherein at least one of the plurality of conductive rods is not directly connected to power, and is arranged in a passive relationship with at least one of the plurality of conductive rods that is electrically coupled to power.

19. The system of claim 16, comprising a first segment comprising the plurality of conductive rods and a second segment comprising a second plurality of conductive rods, the first segment being coupled to the second segment.

20. The system of claim 19, wherein the first segment and the second segment share at least one of the first rod spacer or the second rod spacer.

\* \* \* \* \*